July 10, 1923.

M. CAPLAN

CAMPING TRAILER

Filed Aug. 23, 1922

Meyer Caplan Inventor

By Harry Cole
Nathan Levin

Attorneys

July 10, 1923.  1,461,574
M. CAPLAN
CAMPING TRAILER
Filed Aug. 23, 1922   5 Sheets-Sheet 4
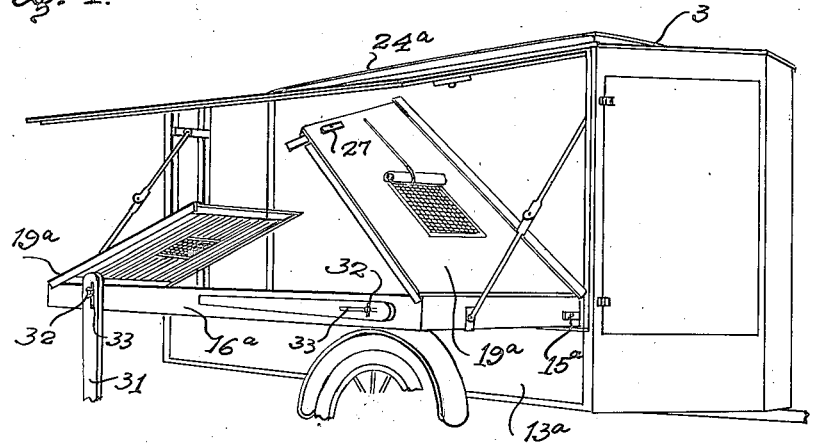
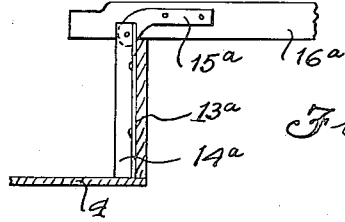
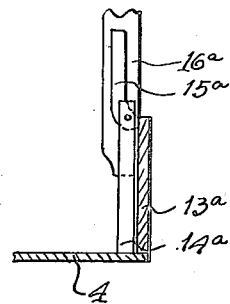
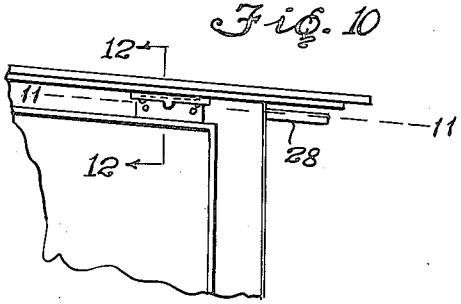
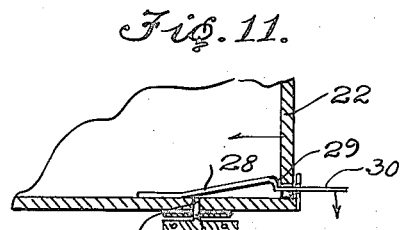
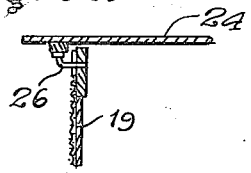
Meyer Caplan, Inventor
By Harry Cohen
Nathan Levin
Attorneys

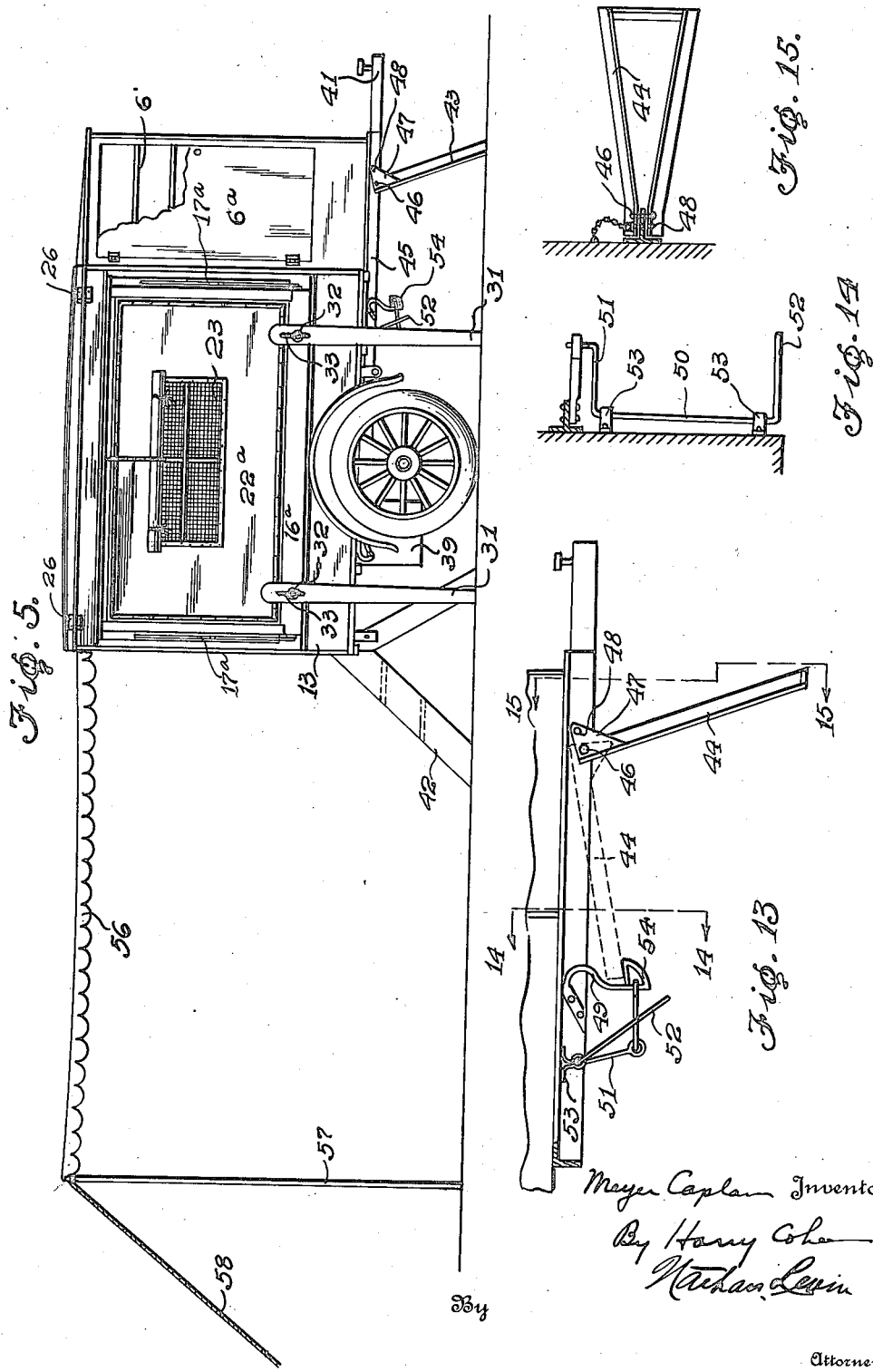

Patented July 10, 1923.

1,461,574

UNITED STATES PATENT OFFICE.

MEYER CAPLAN, OF BROOKLYN, NEW YORK.

CAMPING TRAILER.

Application filed August 23, 1922. Serial No. 583,810.

*To all whom it may concern:*

Be it known that I, MEYER CAPLAN, a citizen of the United States, residing in the city of Brooklyn, in the county of Kings and State of New York, have invented certain new and useful Improvements in Camping Trailers, of which the following is a specification.

The object of this invention is to provide a self contained camping trailer adapted to be hauled behind an automobile and carrying beds, food, clothing and accessories for camping and travelling purposes.

This object is attained by the provision of a structure comprising a body mounted on a two wheeled running gear, the body being designed to provide sleeping compartments formed from certain members easily folded into position when desired for sleeping purposes and reduced to form the sides of the body when the trailer is travelling or when it is not desired to use the compartments. The body is provided with other compartments that may be used for any desired purpose. Suitable supports for each end of the trailer are provided, and other devices and accessories hereinafter described are associated with the trailer for the purpose of rendering travelling and camping more enjoyable.

The construction of the trailer is durable, economical and artistic in appearance. The construction is such that the manipulation of the parts is very easy and may be taken care of by one person without any difficulty. There are no parts to get out of order and no outside supporting or anchoring means are necessary.

For a complete understanding of the invention, its construction and advantages, reference is to be had to the following detailed description and the accompanying drawings in which:

Fig. 4 is a fragmentary perspective view showing how the parts are folded into position to form the sleeping compartments;

Fig. 5 is a side elevation of the trailer in position for use and having associated therewith an awning or shelter from the elements;

Fig. 8 is a detail view of the hinge support for the bottom member of the compartment when in position for use;

Fig. 9 is a view similar to Fig. 8 but shows the position of the hinge support when the bottom member is folded for travelling;

Fig. 10 is a fragmentary end elevation when the trailer is in position for use;

Fig. 11 is a sectional view on the line 11—11 of Fig. 10;

Fig. 12 is a sectional view on the line 12—12 of Fig. 10.

Fig. 13 is a side elevation of a novel support for one end of the trailer;

Fig. 14 is a view of the support taken on the line 14—14 of Fig. 13; and

Fig. 15 is an elevational view on the line 15—15 of Fig. 13.

Figure 1:
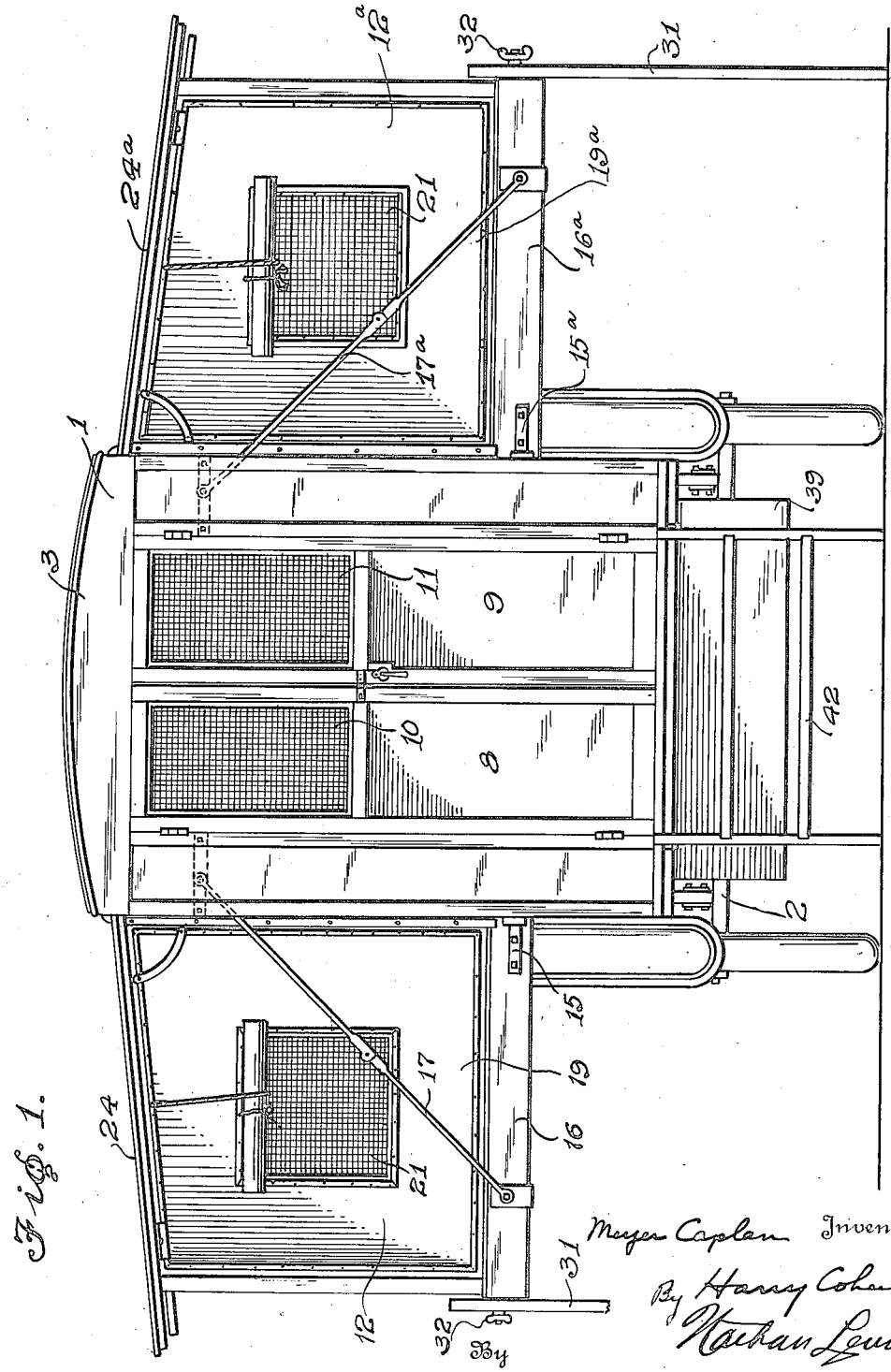
Fig. 1 is a front elevation of the trailer in position ready for use.
Figure 2:
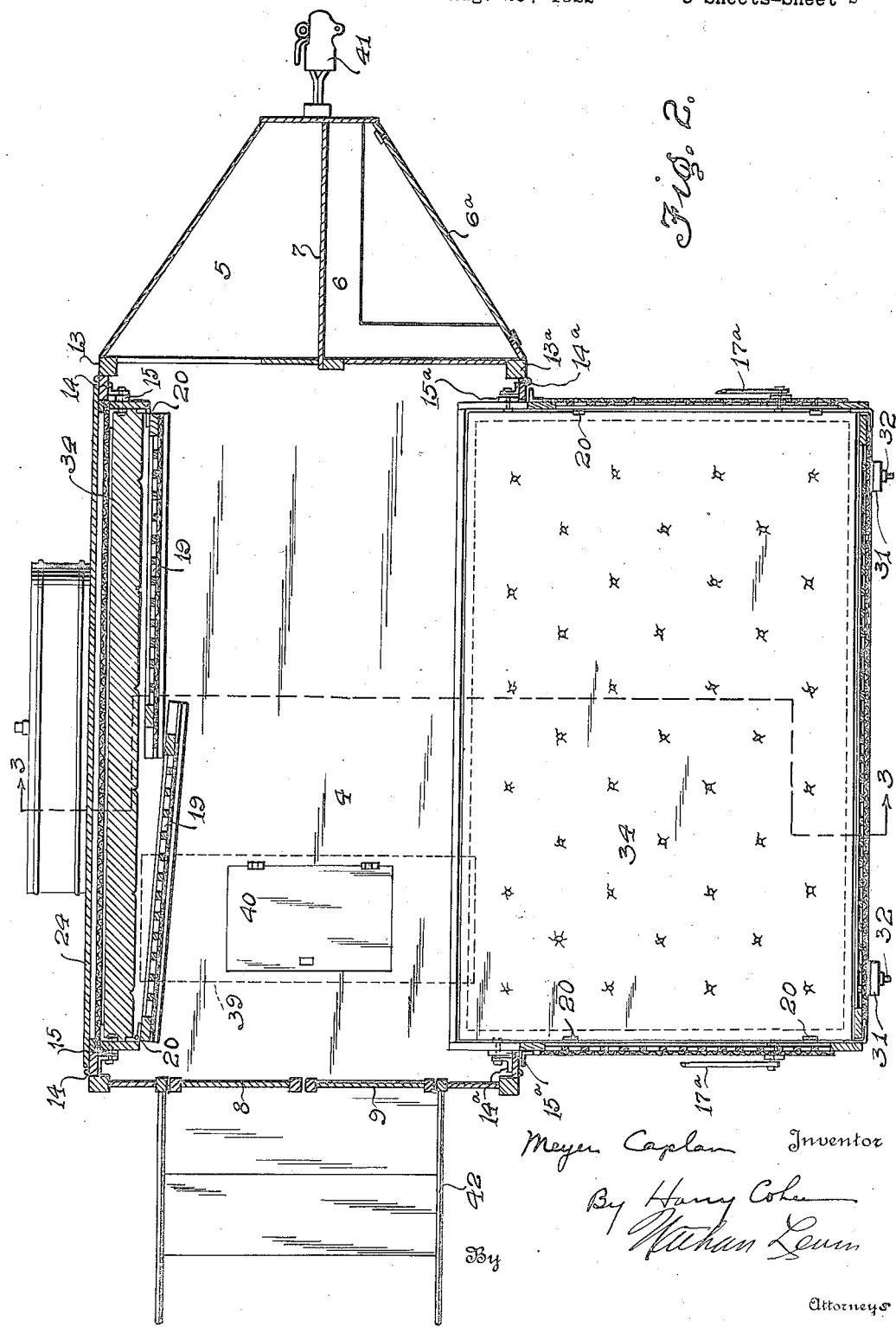
Fig. 2 is a horizontal sectional view of the trailer taken on the line 2—2 of Fig. 3.

Referring to the drawings, it will be seen that the trailer comprises the body 1 mounted on the two wheeled running gear 2. The body is provided with a top or cover 3 and a bottom 4, a rear end divided into compartments 5 and 6 by the partition 7, as shown more clearly by Fig. 2, a front end having the doors 8 and 9 provided with screened windows 10 and 11, and sides adapted to be folded into position to form sleeping compartments designated generally by the reference characters 12 and 12ᵃ.

Figure 3:
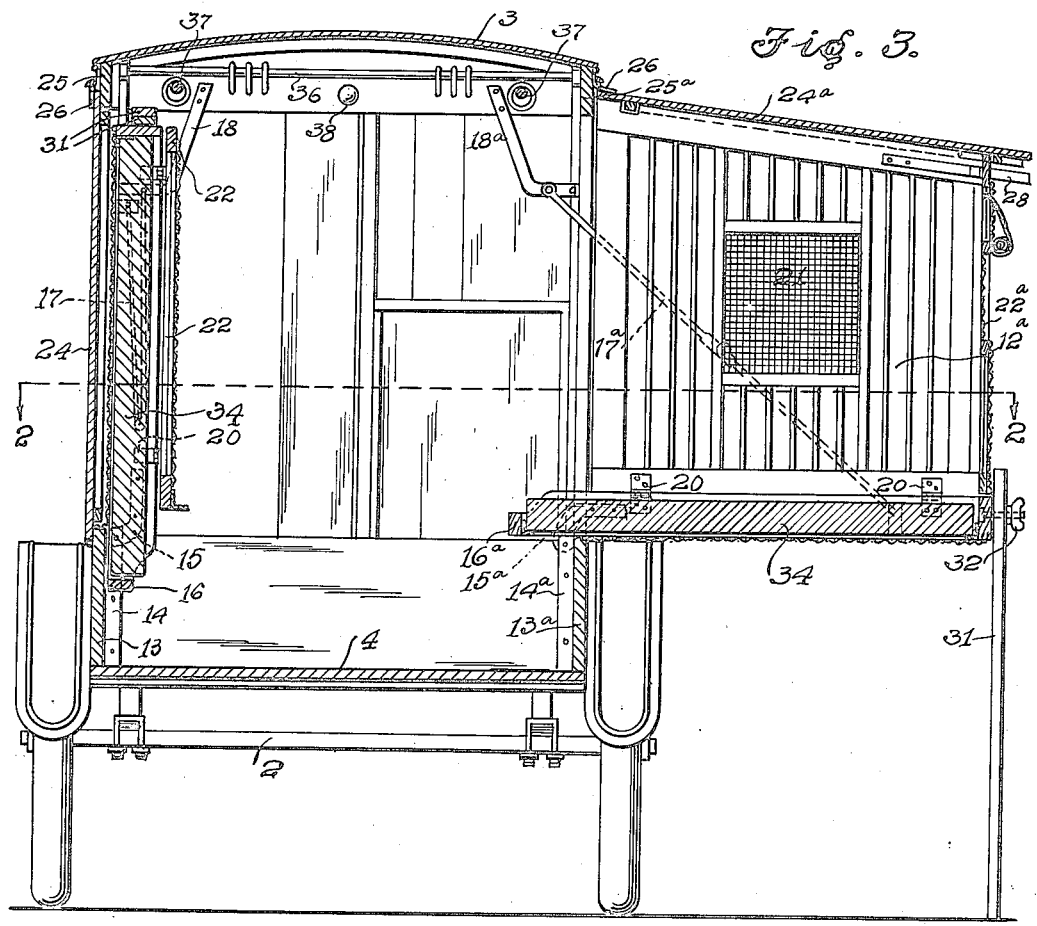
Fig. 3 is a vertical sectional view of the trailer on the line 3—3 of Fig. 2.
Figure 6:
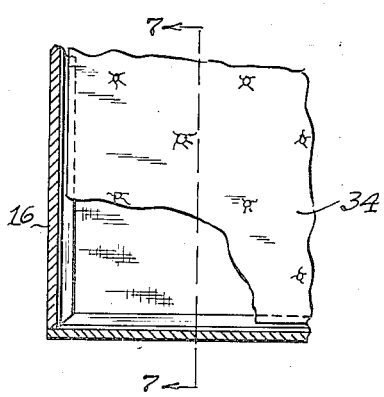
Fig. 6 is a fragmentary plan view of the bottom member of the sleeping compartment provided with the spring and mattress.
Figure 7:
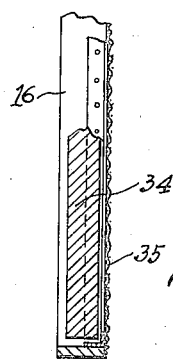
Fig. 7 is a sectional view on the line 7—7 of Fig. 6.

Secured to the floor 4 are the side boards 13 and 13ᵃ which extend from the front end of the trailer to the rear compartments 5 and 6. Fixed to these side boards are iron or steel straps 14 and 14ᵃ. Pivotally secured to the straps 14 and 14ᵃ are the hinges 15 and 15ᵃ fixedly secured to the bottom folding members 16 and 16ᵃ of the sleeping compartments. Referring to Figs. 3, 8 and 9, it will be clearly understood how the bottom members 16 and 16ᵃ are secured to the side boards 13 and 13ᵃ so that the former may be folded from a vertical position when the trailer is travelling to a horizontal position when the sides of the trailer are to be extended to form the sleeping compartments. It will of course be understood that there will be at least two hinges for each bottom member, and in Fig. 4 is shown a part of the rear hinge 15ᵃ. To support the bottom members in the horizontal position, there are provided at each end of the body of the trailer toggle rods 17 and 17ᵃ, the upper ends of which are secured, pivotally, to the angle irons 18 and 18ᵃ, respectively, and lower ends of which are fixed to the ends of the bottom members. It will thus be seen that the bottom members of the compartments are hinged to the side boards 13 and 13ᵃ and suspended from the top 3 of the trailer body 1 by the angles irons 18 and 18ᵃ and the toggle rods 17 and 17ᵃ.

Hinged to the bottom members 16 and 16ᵃ are the end members of the compartments 19 and 19ᵃ, the hinges 20 being clearly shown in Fig. 3. Referring to Fig. 4, it will be seen how the end members 19 and 19ᵃ are folded into vertical position. Windows 21 suitably screened and curtained are provided in the end members 19 and 19ᵃ. The side members 22 and 22ᵃ are also hinged to the bottom members 16 and 16ᵃ and it will be obvious that the former may be positioned between the bottom member 16 or 16ᵃ and the end members 19 or 19ᵃ when the trailer is closed up for travelling, and will be disposed at right angles to the bottom and end members and in a vertical position when the compartments are formed for sleeping. The side members are provided with suitably screened and curtained windows 23.

The tops 24 and 24ᵃ of the sleeping compartments are hinged to the upper side boards 25 and 25ᵃ of the body 1, as shown more clearly by Fig. 3, and by reference to this figure, it will be obvious that when the trailer is closed for travelling the tops 24 and 24ᵃ constitute the sides of the body of the trailer that are locked by suitable means (not shown) to the lower side boards 13 and 13ᵃ. Secured to the tops 24 and 24ᵃ at the ends and near the bottom edge are the dowel pins 26 which are received in the holes 27 of the end members 19 and 19ᵃ whereby the tops and the end members are effectively held in relative position. By referring to Figs. 10 and 12, the holding means or positioning means just described will be clearly shown and the construction will be clear. Fixed to the end members 19 and 19ᵃ, near the tops thereof, are the spring locks 28, shown more clearly by Fig. 11, these locks being constructed as shown to provide the shoulder 29 that will prevent the side member 22 moving inwardly except when the trailer is to be closed for travelling, in which case the end 30 of the spring will be retracted to permit the side member 22 to be folded into position on the bottom member 16. Thus it will be seen that there is provided sleeping compartments formed from parts that are self contained within the trailer, the bottom, ends and sides being folded with respect to each other and the trailer body and the top being pivoted to the trailer top and adapted to enclose the other parts of the compartment.

As an optional additional means of support for the bottoms 16 and 16ᵃ, there are provided the posts 31 provided with slots 33 through which pass thumb screws 32 which are threaded into the sides of bottom members 16 and 16ᵃ. It will be obvious that the provision of the slots 33 enables the length of the posts for support to be adjusted in accord with the requirements of the camping ground. When the trailer is closed the posts 31 are placed longitudinally of the side of the bottom member and clamped in place by the screw 33, as shown by Fig. 4.

The trailer will be provided with as many comforts as can be conveniently carried. The rear compartments 5 and 6 may be used for any purpose desired, but I prefer to use the compartment 5, which is accessible from the inside of the trailer, as a clothes closet, and the compartment 6, which is provided with a hinged door 6ᵃ and the shelves 6′, and accessible from the outside, as a kitchenette. The bottom members of the sleeping compartments are provided with mattresses 34 and springs 35 whereby very comfortable sleeping beds are thus constituted. As shown by Fig. 3, drapery rods 36 and 37 and the accompanying rings are provided so that one compartment may be screened from view of the other and the inside and outside of the trailer by suitable draperies or curtains. Also the trailer is provided with electrical lights 38 which may be supplied with current from the automobile or by a separate storage battery carried by the trailer. A compartment 39 under the floor 4 of the trailer accessible from within the trailer by the trap door 40 is adapted to receive a stove used for cooking purposes while camping. These appointments of the trailer together with the construction tend to make the trailer most enjoyable in its use.

While travelling the trailer is connected to the automobile by the coupling 41 and other means not shown. The coupling forms no part of this invention and may be of any approved construction.

Since the trailer is mounted on a two wheeled running gear, as previously stated, it is necessary to arrange for the end support and this is done by the novel means hereinafter described. There is a suitable support at each end of the trailer. At the front end, the support comprises the combined step ladder and horse 42; and at the rear end the support 43 is provided. The rear support 43 is shown in detail by Figs. 13 to 15 and comprises the member 44 pivoted to the beam 45 at 46. Secured to the member 44 is a triangular piece 47 provided with a hole 48 which is adapted to align with a hole in the beam 45 so that a bolt may be passed through the triangular piece and the beam to securely hold the rear support in proper position as shown by Fig. 5. During travelling the rear support is held in the upper position shown in dotted lines by Fig. 13 by means of the spring latch 49 secured to the beam 45. To enable the unlatching of the rear support in a very easy and advantageous manner, there is provided the operating means comprising the rod 50 having the lever portion 51 and the handle 52. The rod 51 is journalled in the hangers 53 secured to the floor of the trailer. To unlatch the support 43 it is only necessary to operate the lever so as to pull the spring latch away from the member 44 so that the shoulder 54 of the latch is clear of the end of the support. The support will then fall to the ground after which it may easily be secured in place by passing the bolt through the triangular piece 47 and the hole in the beam 45 as previously described.

As an added means for comfort during camping there is provided the awning 56 fixed to the front end of the trailer at one end and supported at the opposite end by posts 57 and held in extended position by guys 58, as will be readily apparent from an inspection of Fig. 5.

The manipulation of the trailer for opening and closing will be understood from the foregoing description. Referring to Fig. 3, one side of the trailer is shown in compact folded form for travelling and one side is shown in position for sleeping. It will be understood that in order to form the compartment from the members previously described, the side 24ª is lifted to a substantially horizontally disposed position, the ends 19ª are then positioned vertically, the dowel pins 26 of the top 24ª entering the holes 27 in the end members, and then the side member 22ª is positioned vertically and latched by the spring 28. The other compartment is similarly formed and the trailer is ready for use.

From the above description it is obvious that there is provided a camping trailer having many advantages over trailers previously invented and while I have shown and described the invention specifically, it is to be understood that the description is merely illustrative of the general construction and changes may be made in view of what is herein disclosed without departing from the invention as defined by the appended claims.

Having thus described my invention, what I claim and desire to secure by Letters Patent of the United States is:

1. In a trailer, a portable body, means associated with said body to form sleeping compartments at each side thereof, said means comprising a bottom member hinged to the lower side of the body, end members hinged to said bottom member, a side member hinged to said bottom member, a top member hinged to the body near the upper end thereof, means associated with said end members and with said top member for relatively positioning said members in compartment forming position, and means associated with said end members and with said side member for releasably holding said members in compartment forming position.

2. In a camping trailer, a portable body mounted on a two wheeled running gear, supports for both ends of the trailer while camping, one of said supports comprising a horse having steps for entering the trailer, and the other support comprising a member pivotally connected to the bottom of the body and means for releasably holding said member away from the ground when the trailer is travelling, said means comprising a spring latch and means for operating said latch to release the pivoted member.

3. In a camping trailer, the combination with a body, of means forming sleeping compartments comprising a bottom member hinged to the body near the lower end thereof, end members hinged to said bottom member, a side member hinged to said bottom member, a top member hinged to the body near the upper end thereof, a dowel pin secured to said top member and received within an aperture in said end member whereby said members are relatively positioned, and a spring latch for holding said side member in position with respect to said end members.

In witness whereof, I hereunto affix my signature.

MEYER CAPLAN.